United States Patent [19]

Inou et al.

[11] Patent Number: 4,685,039

[45] Date of Patent: Aug. 4, 1987

[54] DC/DC CONVERTER

[75] Inventors: Kiyoharu Inou; Hitoshi Saito, both of Tokyo, Japan

[73] Assignee: Yokogawa Hokushin Electric Corporation, Tokyo, Japan

[21] Appl. No.: 873,091

[22] Filed: Jun. 4, 1986

Related U.S. Application Data

[63] Continuation of Ser. No. 667,267, Nov. 1, 1984, abandoned.

[30] Foreign Application Priority Data

Nov. 15, 1983 [JP] Japan ................................. 83-214509
Nov. 15, 1983 [JP] Japan ................................. 83-214511
Nov. 15, 1983 [JP] Japan ................................. 83-214512

[51] Int. Cl.$^4$ .......................................... H02M 3/335
[52] U.S. Cl. ....................................... 363/16; 363/71; 363/65; 323/289
[58] Field of Search ....................... 363/16-17, 363/20-26, 55-58, 65, 68-69, 71, 131-134, 143; 323/267, 289

[56] References Cited

U.S. PATENT DOCUMENTS

| 3,343,061 | 9/1967 | Hetterscheid et al. | 363/20 |
| 3,443,194 | 5/1969 | Cielo | 363/20 |
| 4,062,057 | 12/1977 | Perkins et al. | 363/71 |
| 4,215,392 | 7/1980 | Rhoads | 363/143 X |
| 4,217,632 | 8/1980 | Bardos et al. | 363/17 |
| 4,312,029 | 1/1982 | Zellmer | 323/289 X |

FOREIGN PATENT DOCUMENTS

| 2445093 | 4/1976 | Fed. Rep. of Germany | 363/16 |
| 2643796 | 3/1978 | Fed. Rep. of Germany | 363/17 |
| 3133578 | 3/1983 | Fed. Rep. of Germany | 363/16 |
| 0079474 | 5/1983 | Japan | 363/20 |
| 0978293 | 11/1982 | U.S.S.R. | 363/20 |
| 1065997 | 1/1984 | U.S.S.R. | 363/17 |

OTHER PUBLICATIONS

W. Krumrein, "DC Converter", IBM Technical Discl. Bulletin, vol. 17, No. 7, Dec. 1974, p. 1978.

Primary Examiner—Peter S. Wong
Attorney, Agent, or Firm—Moonray Kojima

[57] ABSTRACT

A DC/DC converter which may be used as a power supply of high capacity. The DC/DC converter comprises first and second converters having their primary terminals connected in series so as to insure high output power and high breakdwon voltage; a first diode for forming a closed circuit together with a transformer of the first converter and a capacitor of the second converter when a switching element of the first converter is turned "off"; and a second diode for forming a closed circuit together with a transformer of the second converter and a capacitor of the first converter when a switching element of the second converter is turned "off".

10 Claims, 20 Drawing Figures

# DC/DC CONVERTER

BACKGROUND OF THE INVENTION

1. Field of the Invention

This invention relates to a DC/DC converter which may be used with a large capacity power supply, and, more particularly, to an improved series connected ON/ON or ON/OFF type DC/DC converter in which two one transistor type ON/ON or ON/OFF converters have their primary terminals connected in series circuit and their secondary terminals connected in parallel circuit, so as to increase the output and raise the breakdown voltage.

2. Description of the Prior Art

Examples of known one transistor ON/ON type DC/DC converters are shown in FIGS. 1 and 2. In the converter shown in FIG. 1, an input voltage $E_{IN}$ is turned "on" and "off" by a transistor $Q_1$ acting as a switching element, and is applied to primary winding $N_{11}$ of transformer $T_1$ so that a voltage induced at secondary winding $N_{12}$ is rectified and smoothed by diodes $D_{11}$ and $D_{12}$, choke $L_1$ and smoothing capacitor $C_{12}$, whereby DC voltage $V_0$ is fed to a load RL.

In the one transistor type ON/ON converter, a high backswing voltage is generated between the two terminals of switching element $Q_1$ by an excited voltage which is stored in the transformer $T_1$ when switching element $Q_1$ is turned "off". In order to protect switching element $Q_1$, therefore, it is customary to equip transformer $T_1$ with a reset winding $N_{13}$, which is connected to diode $D_{13}$ during the turning off operation so that its voltage is clamped at the input voltage $E_{IN}$ thereby to suppress the induced voltage at primary winding $N_{11}$ of transformer $T_1$.

Alternatively, there may be provided a snubber circuit $S_1$ which comprises a resistor $R_1$, capacitor $C_{13}$ and diode $D_{14}$, thereby to effect clamping operation.

A system equipped with reset winding $N_{13}$ has a small amount of loss because the excited energy is returned to the input voltage $E_{IN}$. If the coupling between reset winding $N_{13}$ and primary winding $N_{11}$ is insufficient, however, the backswing voltage cannot be clamped sufficiently. On the other hand, a system using a snubber circuit can clamp the backswing voltage at a low level, only if the CR time constant is increased. However, a system using the snubber circuit has a large loss because of the power consumed by resistor R. Thus, in actual practice, it is desirable to use both the above discussed reset winding circuit and the snubber circuit, such as shown in FIG. 1.

As shown in FIG. 2, even in a series connected ON/ON type DC/DC converter using two one-transistor type ON/ON type converters having their primary terminals connected in series and their secondary terminals connected in parallel to increase the output and reduce the breakdown voltage of the switching element, two one-transistor type ON/ON type converters $CV_1$ and $CV_2$ are equipped with reset winding $N_{13}$ and $N_{23}$ and snubber circuits $S_1$ and $S_2$. Disadvantageously, this converter is complex and unreliable due to losses in the snubber circuit.

Moreover, disadvantageously, in the circuit of FIG. 2, switching elements $Q_1$ and $Q_2$ of the respective converters $CV_1$ and $CV_2$ are required to have breakdown voltages which are twice as high as divided input voltages $E_1$ (i.e. the voltage between two terminals of capacitor $C_{11}$) and $E_2$ (i.e. the voltage between two terminals of capacitor $C_{21}$). In case the equivalent input impedances of the respective converters are equal, the switching elements may have a breakdown voltage of $E_{IN}$ because the equations $$E_1 = E_2 = E_{IN}/2$$

hold. If the equivalent impedances are different, however, the switching elements are required to have a breakdown voltage of no less than $E_{IN}$ because $E_1 = E_2$ so that one of the divided input voltages is higher than the other. In other words, the circuit of FIG. 2 has little effect in reduction of the breakdown voltage, and the switching elements are required to have the breakdown voltage which is twice as high as $E_{IN}$, if safety is taken into consideration.

SUMMARY OF THE INVENTION

Accordingly, an object of the invention is to overcome the aforementioned and other deficiencies, and disadvantages of the prior art.

Another object is to provide a series connected ON/ON type or ON/OFF type DC/DC converter which has a simple means for clamping the backswing voltage with low loss and without failure.

A further object is to provide a DC/DC converter which has a simple means for detecting a peak currrent at the primary terminals minals and withour deteriorating responsiveness, so as to effect protection against excessive current.

A still further object is to provide a DC/DC converter which substantially equalizes the shared output currents of the two converters.

The foregoing and other objects are attained by the invention which encompasses a DC/DC converter comprising first and second one transistor converters, each comprising a transformer having primary and secondary coils, a switching element for connecting the primary coil in series to an AC power supply, and a capacitor connected in series through the switching element to the primary coil; with the primary terminals of the transformers of the first and second converters being connected in series with each other; a first diode for forming a closed circuit together with the transformer of the first converter and the capacitor of the second converter when the switching element of the first converter is turned "off"; and a second diode for forming a closed circuit together with the transformer of the second converter and the capacitor of the first converter when the switching element of the second converter is turned "off".

DETAILED DESCRIPTION OF THE PREFERRED EMBODIMENTS

Figure 1:
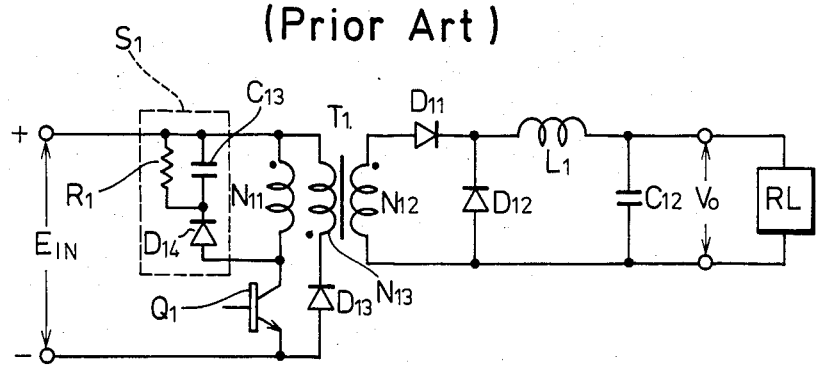
FIGS. 1 and 2 are circuit diagrams depicting prior art DC/DC converters.
Figure 2:
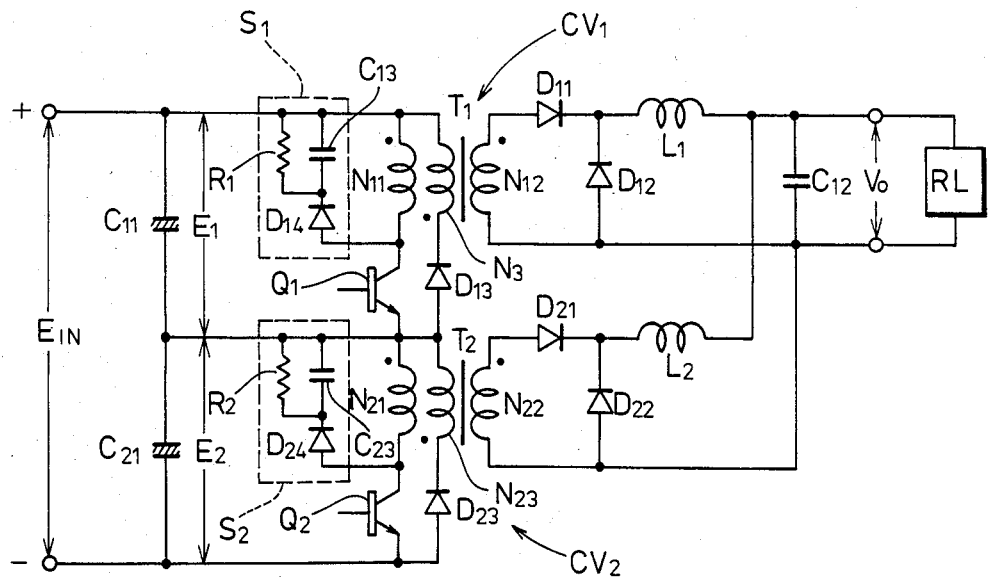
Figure 3:
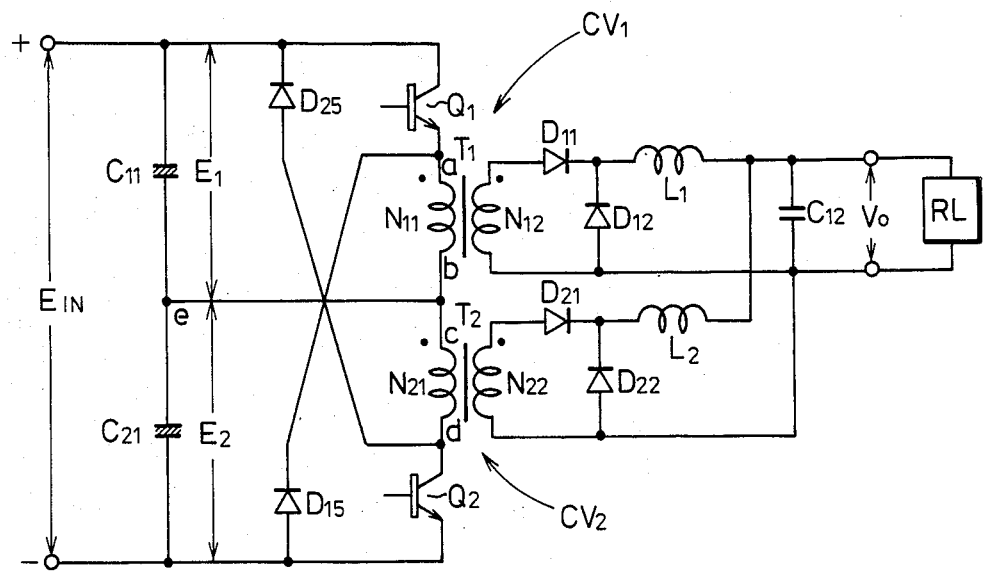
FIG. 3 is a circuit diagram depicting an illustrative embodiment of the invention.

FIG. 3 depicts an illustrative DC/DC converter wherein ON/ON converters are used. The embodiment of FIG. 3 is different from the conventional converter depicted in FIG. 2 in the following manner. (1) At the side of converter $CV_1$ transformer $T_1$ is driven at the emitter and follower of switching element (e.g. a transistor)$Q_1$. (2) At the side of converter $CV_2$ a transformer $T_2$ is driven at the collector of switching element (e.g. a transistor) $Q_2$. (3) One terminal b of primary winding $N_{11}$ of transformer $T_1$ and one terminal c of primary winding $N_{21}$ of transformer $T_2$ are connected commonly to node e of capacitors $C_{11}$ and $C_{21}$. (4) Diode $D_{15}$ is connected between the other terminal a of primary winding $N_{11}$ and the minus (−) terminal of DC input voltage $E_{IN}$. (5) A diode $D_{25}$ is connected between the other terminal d of primary winding $N_{21}$ and the plus (+) terminal of DC input voltage $E_{IN}$. (6) Reset winding $N_{13}$ and $N_{23}$ are eliminated. (7) Snubber circuits $S_1$ and $S_2$ are eliminated.

The DC/DC converter operates as follows. First, when the switching element $Q_1$ is turned "on", a current is caused to flow via a circuit comprising $Q_1 \rightarrow T_1 \rightarrow C_{21}$ by the DC input voltage so that transformer $T_1$ becomes plus (+) at terminal a and minus (−) at terminal b. Then, when switching element $Q_1$ is turned "off", transformer $T_1$ has its polarity inverted so that terminal a becomes minus (−) and terminal b becomes plus (+). As a result, a reset current flows via diode $D_{15}$ to transformer $T_1$ by way of a circuit comprising $N_{11} \rightarrow C_{21} \rightarrow N_{11}$, and the two terminals of transformer $T_1$ are clampled at terminal voltage $E_2$ of capacitor $C_{21}$ so that their voltage will not rise any more. At this time, capacitor $C_{21}$ is charged by the reset current, and the excited energy of transformer $T_1$ is not lost because it is returned as the input voltage of the other converter $CV_2$. In view of the voltage to be applied to switching element $Q_1$, on the other hand, element $Q_1$ may have a voltage of $E_{IN}$ or higher because it does not receive a voltage of $E_1 + E_2 = E_{IN}$ or higher. This is because, even if input voltage $E_1$ becomes higher for $E_1 = E_2$, the switching element $Q_1$ does not essentially receive the voltage of $E_1 + E_2 = E_{IN}$ or higher because the clamp is made at the voltage $E_2$ during the resetting period.

On the other hand, the operation of switching element $Q_2$ are similar to those of $Q_1$. When element $Q_2$ is turned "on" the current is caused to flow by DC input voltage $E_{IN}$ via a circuit comprising $C_{11} \rightarrow T_2 \rightarrow Q_2$ so that transformer $T_2$ becomes plus (+) at terminal c and minus (−) at terminal d. Then, when element $Q_2$ is turned "off", transformer $T_2$ has its polarity inverted so that terminal c becomes minus (−) and terminal d becomes (+). As a result, the reset current of transformer $T_2$ flows via diode $D_{25}$ by way of a circuit comprising $N_{21} \rightarrow D_{25} \rightarrow C_{11} \rightarrow N_{21}$ and the two terminals of transformer $T_2$ are clamped at the terminal voltage $E_1$ of capacitor $C_{11}$ so that their voltage will not rise anymore. Also, at this time, capacitor $C_{11}$ is charged by the reset current, and the excited energy of transformer $T_2$ is not lost because it is returned to the input voltage of the other converter $CV_1$.

Figure 4A:
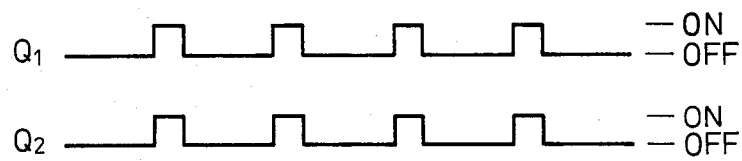
FIGS. 4A and 4B are charts depicting drive waveforms of switching elements.
Figure 4B:
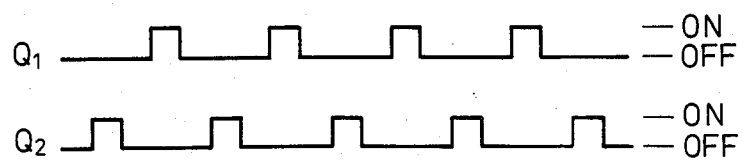
Figure 5A:
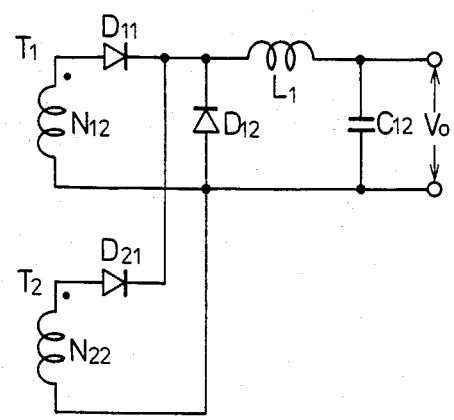
FIGS. 5A and 5B are circuit diagrams depicting examples of connections to a secondary coil.
Figure 5B:
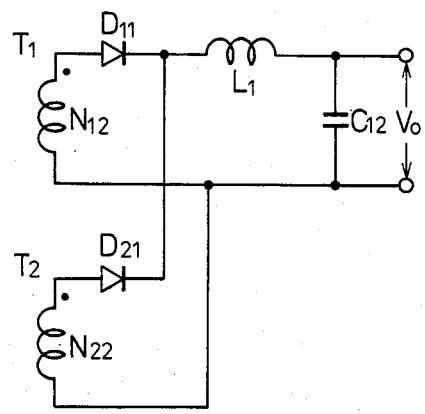

Switching elements $Q_1$ and $Q_2$ may be driven either simultaneously, as shown by pulses in FIG. 4A, or alternatively, as shown by pulses in FIG. 4B. In the case of the alternative drive, as shown in FIG. 4B, it is possible to drop the value of capacitor $C_{12}$ at the secondary side to one half or lower. On the other hand, the circuits at the secondary side may share choke $L_1$ and diode $D_{12}$, as shown in FIG. 5A. In this case, diode $D_{12}$ may be dispensed with, as shown in FIG. 5B.

Figure 6A:
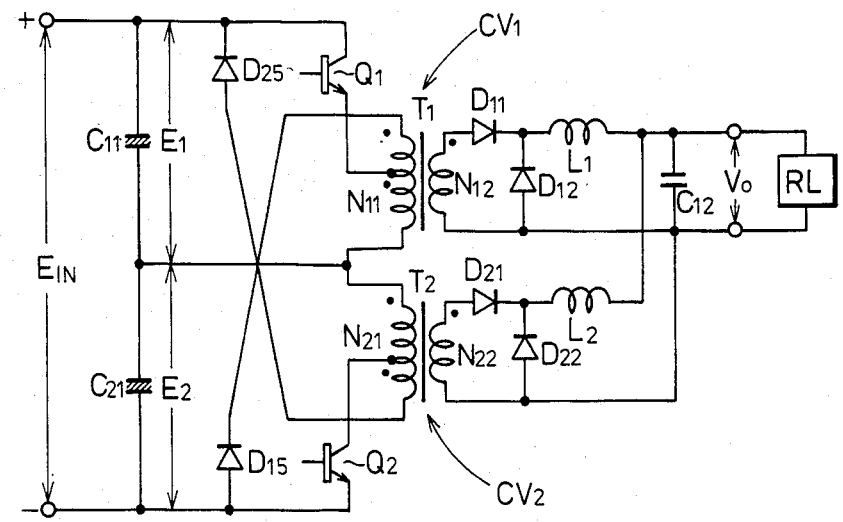
FIGS. 6A, 6B, 7A, 7B and 8 are circuit diagrams depicting other illustrative embodiments of the invention.
Figure 6B:
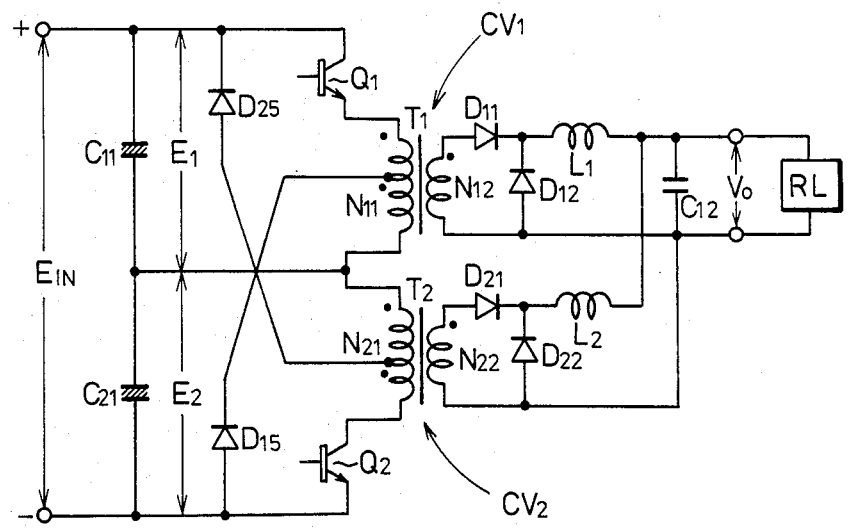

FIGS. 6A and 6B are circuit diagrams showing other embodiments of the DC/DC converter according to the invention. The embodiments of FIGS. 6A and 6B are different from that of FIG. 3 in that transformers $T_1$ and $T_2$ have their primary windings $N_{11}$ and $N_{21}$ equipped with intermediate taps, respectively. As shown in FGI. 6A, the backswing voltage can be reduced at a ratio of the intermediate taps if the drives of transformers $T_1$ and $T_2$ are started from the taps and if diodes $D_{15}$ and $D_{25}$ are connected with the leading ends of the windings. As shown in FIG. 6B, if the drives of transformers $T_1$ and $T_2$ are started from the winding ends and if diodes $D_{15}$ and $D_{25}$ are connected with the taps, on the other hand, the reset period can be shortened, although the backswing voltage is raised.

Figure 7A:
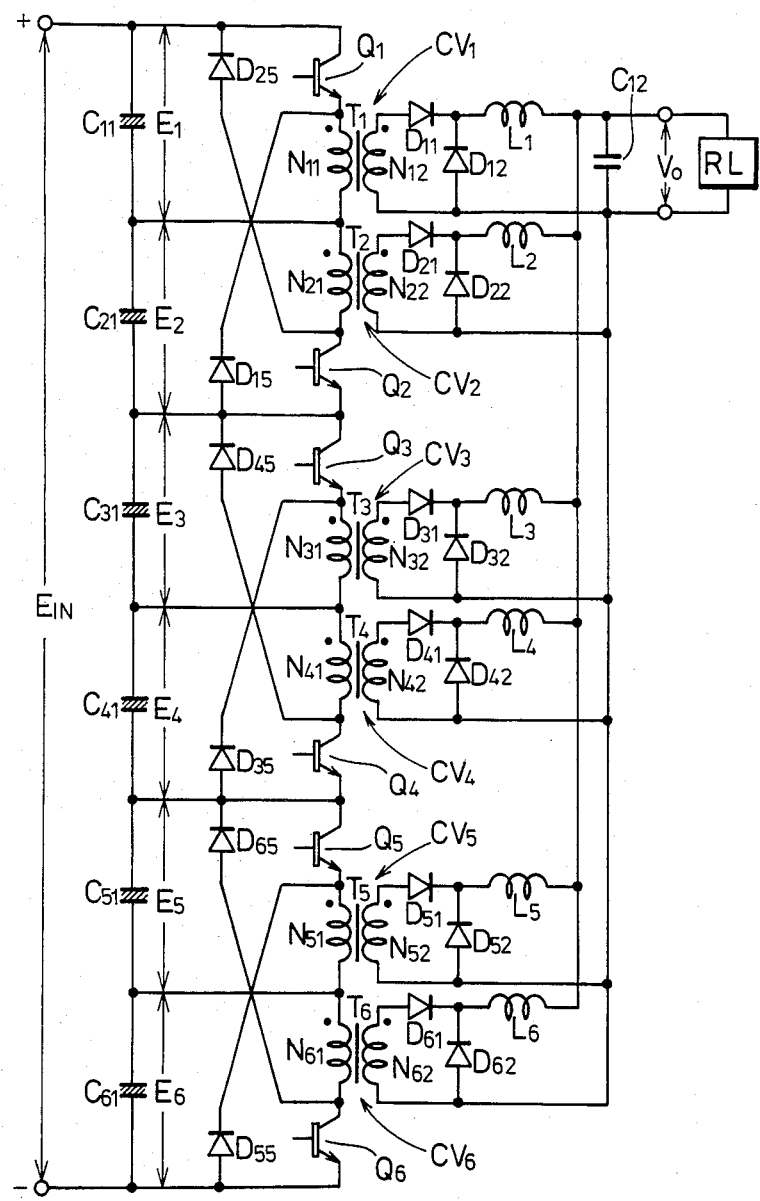
Figure 7B:
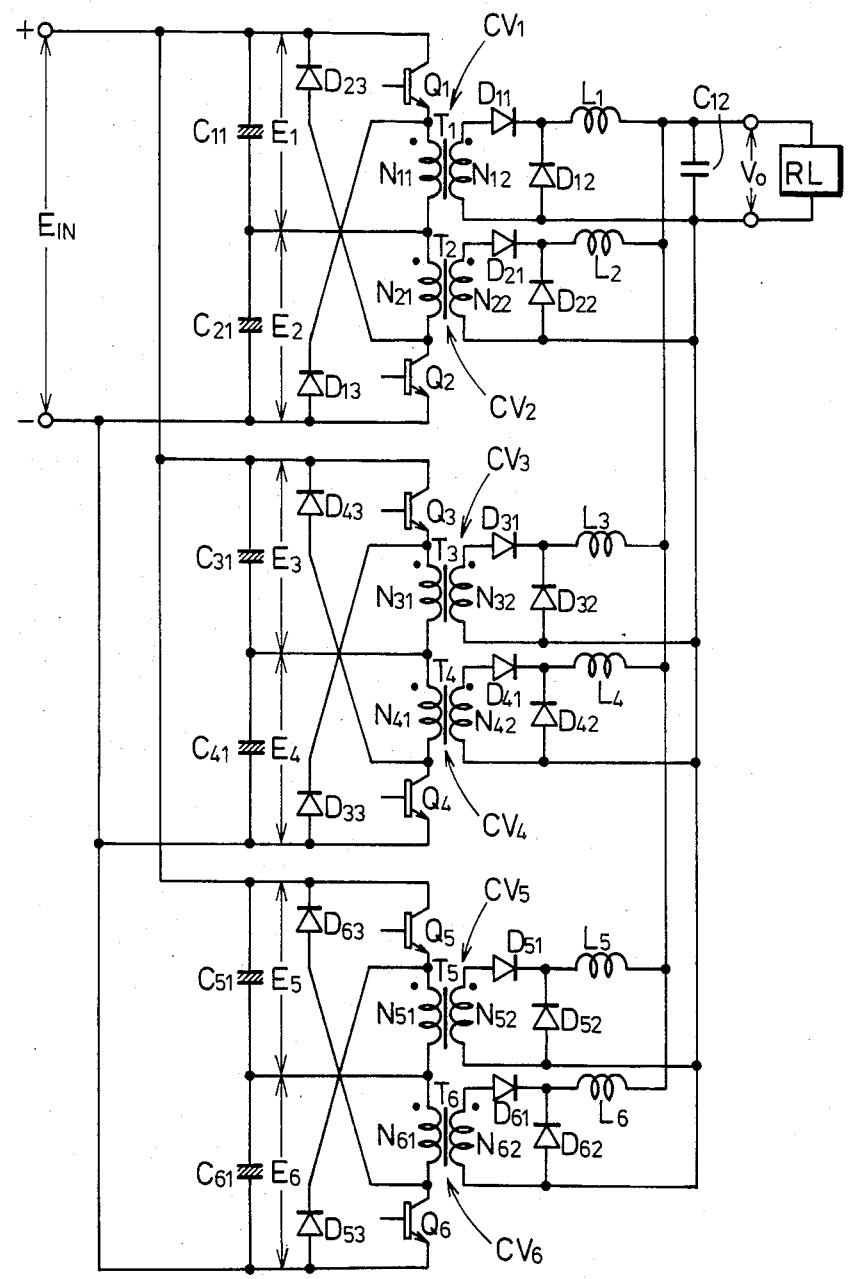

A higher output can be obtained if a plurality of DC/DC converters of the invention are used, such that they are connected either in series, such as shown, for example, in FIG. 7A, or in parallel, as shown for example in FIG. 7B, with the DC input voltage $E_{IN}$.

Figure 8:
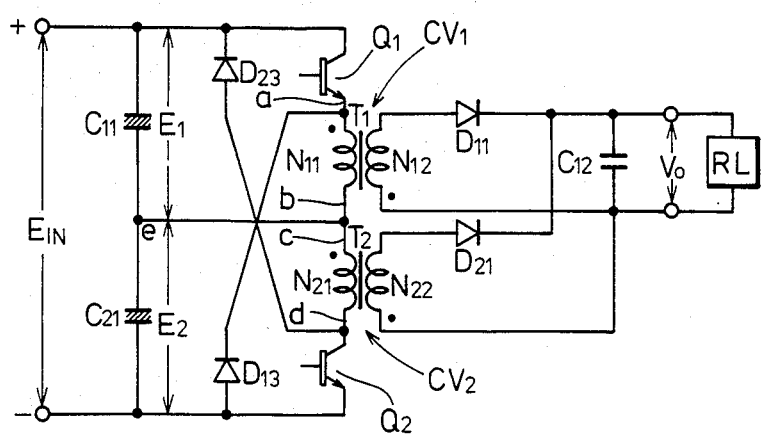

FIG. 8 is a circuit diagram showing a further illustrative embodiment of the invention, in which ON/OFF converters are used. This embodiment is different from that of FIG. 3, in the following respects. (1) The respective transformers $T_1$ and $T_2$ have their secondary windings $N_{12}$ and $N_{22}$ reversed. (2) Diodes $D_{12}$ and $D_{22}$ are eliminated. (3) Chokes $L_1$ and $L_2$ are eliminated.

Figure 9:
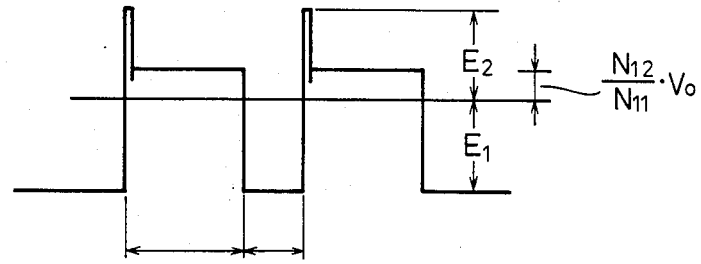
FIG. 9 is a waveform chart depicting an example of operation.

The DC/DC converter of FIG. 8 operates as follows. First, when switching element $Q_1$ at the side of converter $CV_1$ is turned "on", terminal voltage $E_1$ of capacitor $C_{11}$, which is divided from input voltage $E_{IN}$, is applied to transformer $T_1$. When switching element $Q_1$ is turned "off", clamping diode $D_{13}$ is rendered conductive so that the backswing voltage generated at primary winding $N_{11}$ of transformer $T_1$ is clamped at terminal voltage $E_2$ of capacitor $C_{21}$. If the residual energy stored as the leakage inductance is released, a voltage determined by multiplying voltage $V_0$ by winding ratio of $N_{12}/N_{11}$ is applied between the two terminals of primary winding $N_{11}$. This relationship is shown in the waveform chart of FIG. 9.

When switching element $Q_2$ is turned "on", terminal voltage $E_2$ of capacitor $C_{21}$, which is divided from input voltage $E_{IN}$, is applied to transformer $T_2$. When switching element $Q_2$ is turned "off", a clamping diode $D_{23}$ is rendered conductive so that the backswing voltage generated at primary winding $N_{21}$ of transformer $T_2$ is clamped at terminal voltage $E_1$ of capacitor $C_{11}$. When the residual energy stored as the leakage inductance is released, the voltage determined by multiplying the winding ratio of voltage $V_0$ is applied between the two terminals of winding $N_{21}$. Thus, the backswing voltage is not lost because it is returned to the input voltage of the other converter.

Figure 10A:
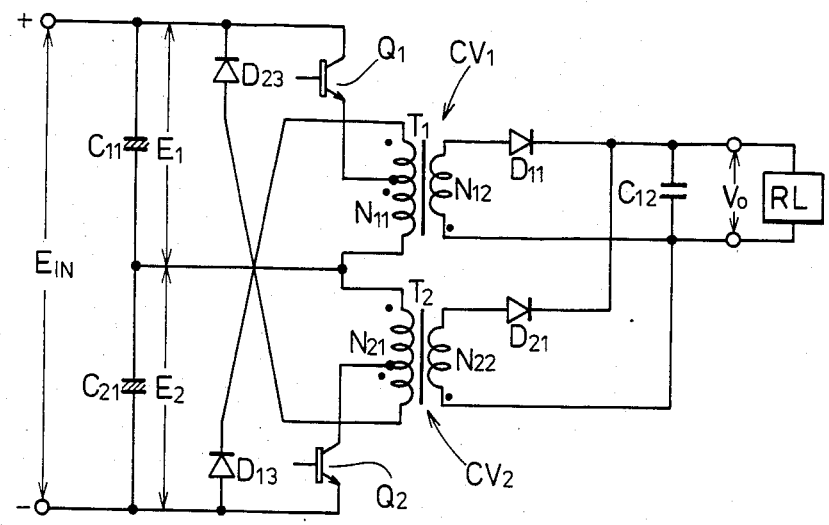
FIGS. 10A, 10B and 11 are circuit diagrams depicting further illustrative embodiments of the invention.
Figure 10B:
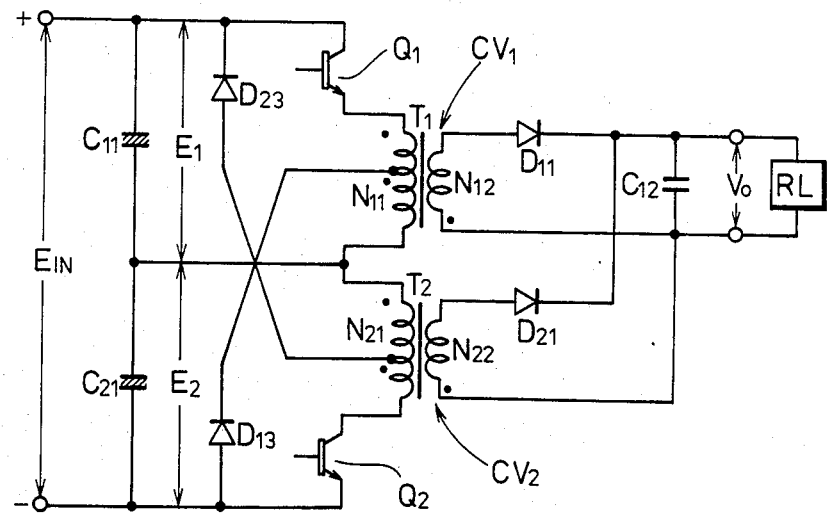

FIGS. 10A and 10B are circuit diagrams showing further illustrative embodiments of the invention and differ from the embodiment shown in FIG. 8, in that transformer $T_1$ and $T_2$ have their primary windings $N_{11}$ and $N_{21}$ equipped with intermediate taps, respectively.

In FIG. 10A, the drives of transformers $T_1$ and $T_2$ are started from the taps, and the diodes $D_{13}$ and $D_{23}$ are connected with the winding ends.

In FIG. 10B, the drives of transformers $T_1$ and $T_2$ are started from the winding ends, and the diodes $D_{13}$ and $D_{23}$ are connected to the taps. In the embodiment of FIG. 10A, the backswing voltage to be applied to switching elements $Q_1$ and $Q_2$ can be reduced at the ratio of the intermediate taps so that the breakdown voltages of the switching elements can be dropped.

Figure 11:
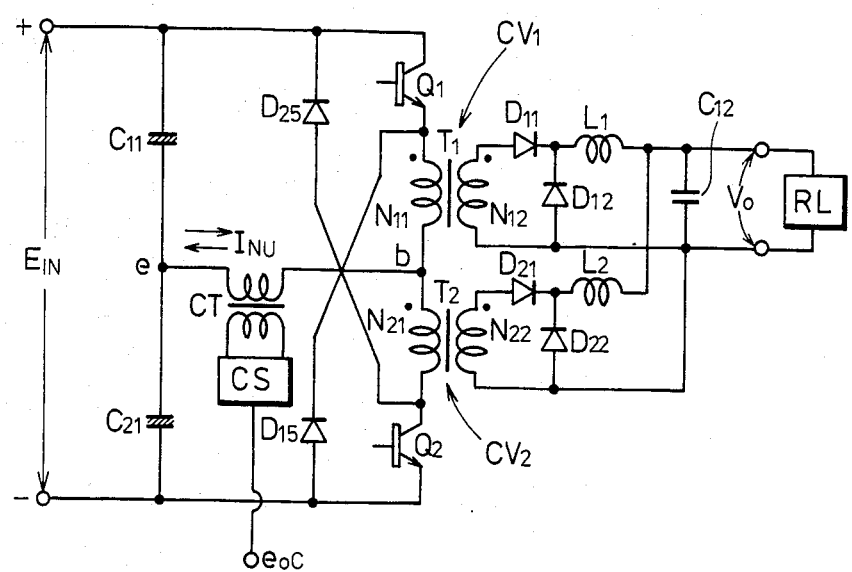

FIG. 11 depicts a still further embodiment of the invention wherein a current transformer CT is connected between node b of a series circuit comprising primary winding $N_{11}$ of transformer $T_1$ and switching element $Q_1$ of first converter $CV_1$, and a series circuit comprising primary winding $N_{21}$ of transformer $T_2$ and switching element $Q_2$ of second converter $CV_2$; and node e between capacitors $C_{11}$ and $C_{21}$. The output of current transformer CT is applied to an overcurrent detecting circuit CS so that a signal $e_{OC}$ for effecting protection against any over current may be obtained from the overcurrent detecting circuit CS.

Figure 12A:
FIGS. 12A, 12B, and 12C are waveform charts depicting one example of the operation of FIG. 11.
Figure 12B:
Figure 12C:

If switching elements $Q_1$ and $Q_2$ of first and second converters $CV_1$ and $CV_2$ are driven with a phase difference of 180°, as shown in FIGS. 12A and 12B, current $I_{NV}$ to flow through current transformer CT flows forward (i.e. in the direction from node b to node e) when element $Q_1$ is "on" and element $Q_2$ is "off"; and backward (i.e. in the direction from node e to node b) when element $Q_1$ is "off" and element $Q_2$ is "on". Thus, the bilateral currents flow through current transformer CT so that the peak value can be reproduced even without the voltage doubled rectifying and smoothing operations. As a result, the output of current transformer CT can be inputted directly to over current detecting circuit CS, and signal $e_{OC}$ for over current protection can be obtained with excellent response without requiring any voltage doubled rectifying and smoothing circuit.

Figure 13:
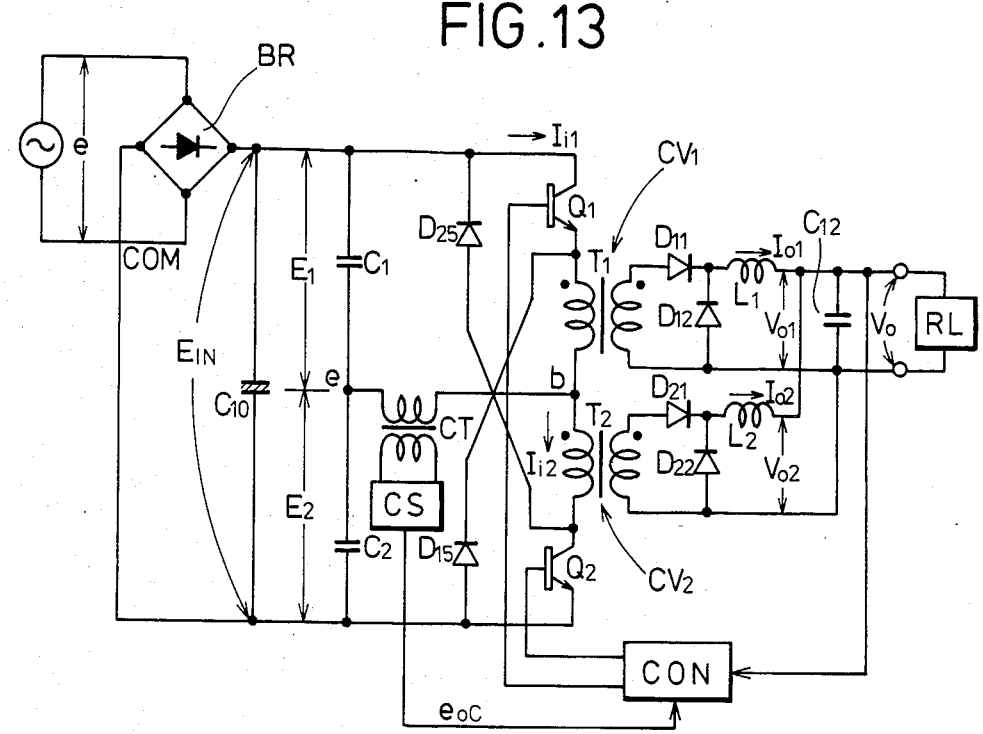
FIGS. 13 and 14 are circuit diagrams depicting still further illustrative embodiments of the invention.

FIG. 13 depicts a further illustrative embodiment wherein a power supply is used therewith. This embodiment is different from the embodiment of FIG. 11 in the following respects. (1) DC voltage $E_{IN}$ is smoothed by a smoothing capacitor $C_{10}$ after it has been rectified from AC supply voltage e by a bridge rectifying circuit BR and is applied to the two one-transistor type DC/DC converters $CV_1$ and $CV_2$ having their primary terminals connected in series. (2) Capacitors $C_1$ and $C_2$ for passing high frequency currents are connected between the input terminals of converters $CV_1$ and $CV_2$, respectively. (3) A control circuit CON controls the drive periods i.e. duty ratio $D_1$ and $D_2$ of switching elements $Q_1$ and $Q_2$ so that output voltage $V_0$ may take a target value.

In the embodiment of FIG. 13, a current $I_{i1}$ flows from the input (disregarding CT) via circuit comprising $Q_1 \rightarrow T_1 \rightarrow C_2$ when switching element $Q_1$ of converter $CV_1$ is turned "on"; current $I_{i2}$ flows from the input (disregarding CT) via a circuit comprising $C_1 \rightarrow T_2 \rightarrow Q_2$ when the switching element $Q_2$ of converter $CV_2$ is turned "on". In the respective converters $CV_1$ and $CV_2$, the below relationships (1) and (2) hold because the powers at the primary and secondary sides are equal, provided the following conditions are met. (a) If the output voltages and currents of the respective converters are designated by $V_{01}$ and $V_{02}$, and $I_{01}$ and $I_{02}$. (b) If winding ratios $N_{12}/N_{11}$ and $N_{22}/N_{21}$ of transformers $T_1$ and $T_2$ are assumed to be 1. (c) If the drop voltages of the secondary sides are designated by $V_{R1}$ and $V_{R2}$, respectively. (d) If the terminal voltages of capacitors $C_1$ and $C_2$ are designated by $E_1$ and $E_2$.

$$(V_{01}+V_{R1})I_{01}=E_1 I_{i1} \tag{1}$$

$$(V_{02}+V_{R2})I_{02}=E_2 I_{i2} \tag{2}$$

On the other hand, the output voltages $V_{01}$ and $V_{02}$ of the respective converters $CV_1$ and $CV_2$ are given by the below equations (3) and (4).

$$V_{01}=E_1 \cdot D_1 - V_{R1} \tag{3}$$

$$V_{02}=E_2 \cdot D_2 - V_{R2} \tag{4}$$

If equations (1) and (2) are substituted into equations (3) and (4), respectively, the below equations (5) and (6) will hold.

$$D_1 I_{01}=I_{i1} \tag{5}$$

$$D_2 I_{02}=I_{i2} \tag{6}$$

As a result, the input impedances $Z_1$ and $Z_2$ of converters $CV_1$ and $CV_2$ are expressed by the below equations (7) and (8).

$$Z_1 = \frac{E_1}{I_{i1}} = \frac{E_1}{D_1 I_{01}} \tag{7}$$

$$Z_2 = \frac{E_2}{I_{i2}} = \frac{E_2}{D_2 I_{02}} \tag{8}$$

Hence, input impedance $Z_1$ or $Z_2$ is decreased with increase of output current $I_{01}$ or $I_{02}$, but is increased with the decrease of the same.

Since input voltage $E_{IN}$ is a DC voltage, on the other hand, terminal voltages $E_1$ and $E_2$ of the respective capacitors $C_1$ and $C_2$ are not influenced by their capacitances but take the values which are derived by dividing input voltage $E_{IN}$ by input impedances $Z_1$ and $Z_2$, as are expressed by the below equations (9) and (10), respectively.

$$E_1 = \frac{Z_1}{Z_1 + Z_2} \cdot E_{IN} \tag{9}$$

$$E_2 = \frac{Z_2}{Z_1 + Z_2} \cdot E_{IN} \tag{10}$$

Moreover, the following relationship (11) is derived from the above equations (9) and (10).

$$\frac{E_1}{Z_1} = \frac{E_2}{Z_2} = \frac{E_{IN}}{Z_1 + Z_2} \tag{11}$$

Thus, input voltages $E_1$ and $E_2$ allotted to the respective converters are reflected by the input impedances.

If the allotted output current $I_{01}$ is increased by any cause, therefore, input impedance $Z_1$ of converter $CV_1$ is decreased to change the voltage dividing ratio of input voltage $E_{IN}$. As a result, allotted input voltage $E_1$ of converter $CV_1$ is decreased and allotted input voltage $E_2$ of converter $CV_2$ is increased so that output voltage $V_{01}$ of the former is decreased and the output voltage $V_{02}$ of the latter is increased. In other words, converters $CV_1$ and $CV_2$ have negative feedback actions against increases of allotted output currents. Also, the following relationship (12) is derived from equations (7), (8) and (9) so that the two converters operate at the points where their allotted output currents $I_{01}$ and $I_{02}$ and duty ratios $D_1$ and $D_2$ are equalized.

$$D_1 I_{01} = D_2 I_{02} \quad (12)$$

If the duty ratios $D_1$ and $D_2$ are equal, specifically, the two converters operate at the points where the allotted output currents become equal. Moreover, the difference between impedances $R_1$ and $R_2$ of the current paths do not exert any influence upon the allotted output currents. As is apparent from equation (12), the difference between the duty ratios is reflected as it is upon the allotted output currents $J_{01}$ and $J_{02}$, but is not enlarged.

Figure 14:
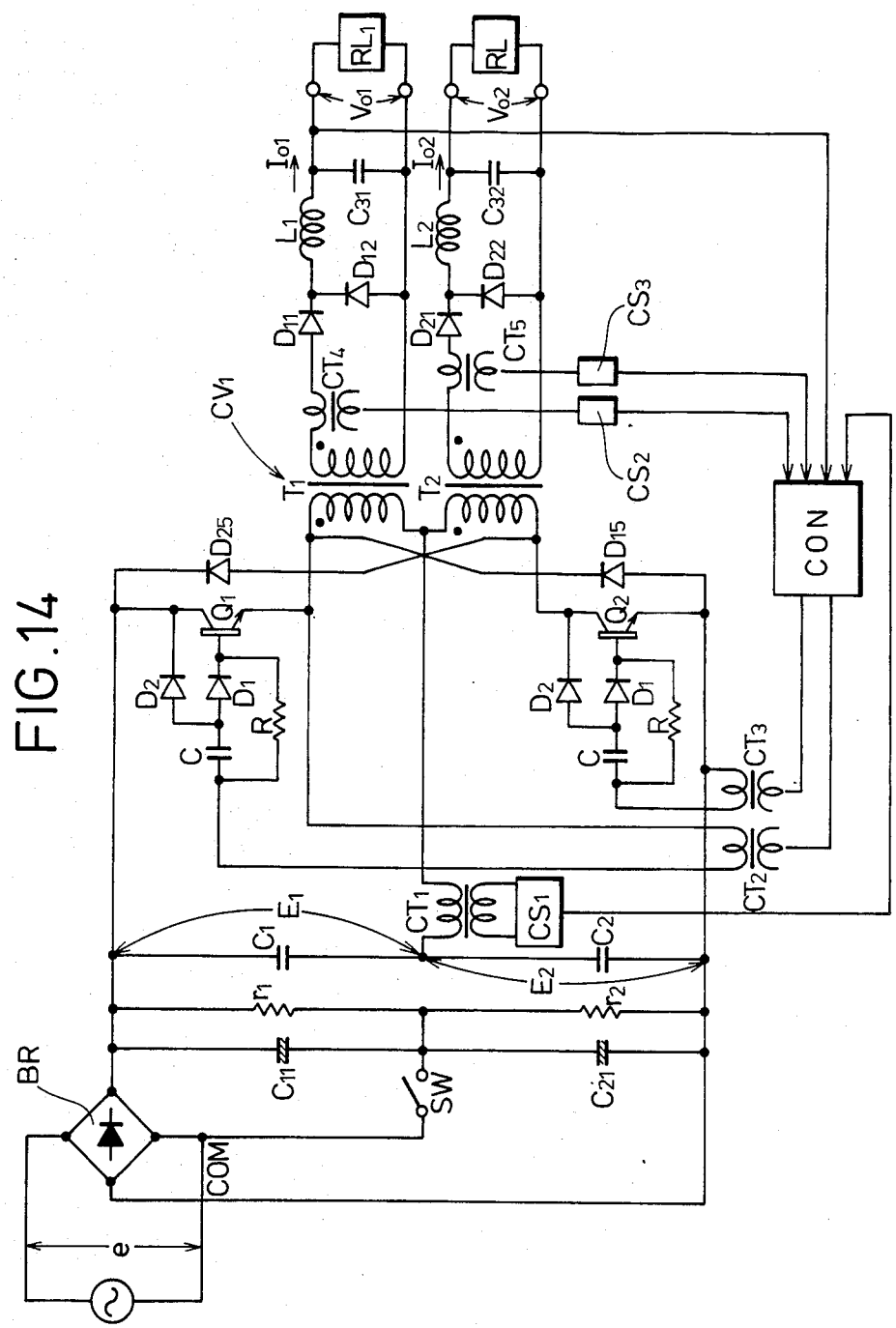

FIG. 14 depicts another illustrative embodiment wherein a change-over switch SW is connected between the middle point of the series connected smoothing capacitors $C_{11}$ and $C_{2i}$ for smoothing the output of the rectifying circuit BR and a common line COM at the reference side of the AC supply voltage. Switch SW is turned "on" to effect voltage multiplied rectification, when the AC supply voltage e is at 110 volts, for example. Switch SW is turned "off" to effect bridge rectification when the AC supply voltage e is at 220 volts, for example. In this manner, the embodiment can be used for both systems having the AC supply voltage of 110 volts and 220 volts. Moreover, the respective base circuits of transistors $Q_1$ and $Q_2$, acting as the switching elements, are equipped with an overdrive current passage, which comprises capacitor C and diodes $D_1$ and $D_2$, in addition to a steady base current supply circuit of a resistance R so that the overdrive current may be given via capacitor C when they are turned "on".

In the steady state, the base current is supplied via resistor R to transistors $Q_1$ and $Q_2$ so that these transistors $Q_1$ and $Q_2$ can be saturated sufficiently because the bypass passage through the diodes $D_1$ and $D_2$ does not function. In the case of a light load, transistors $Q_1$ and $Q_2$ are saturated so that the overdrive current is shunted to diode $D_2$ when the collector voltage is dropped sufficiently. During the turning on operation, the overdrive takes its self balance in accordance with the level of the load, but the storage time during the turning off operation is not changed as much in accordance with the load.

Figure 15:
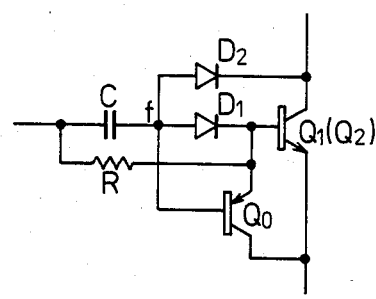
FIG. 15 is a circuit diagram depicting an important part of another example of the drive circuit of the switching element.

To this circuit, there may be added, as shown in FIG. 15, between the base and emitted of transistor $Q_1$ (or $Q_2$) acting as the switching element, a transistor $Q_0$ which is connected to node f between capacitor C and diode $D_1$ thereby to speed up the turning off operation.

In FIG. 14, moreover, output voltages $V_{01}$ and $V_{02}$ are extracted independently of each other from the respective converters $CV_1$ and $CV_2$. Here control circuit CON receives output voltage $V_{01}$ of converter $CV_1$ and controls the duty ratios of switching elements $Q_1$ and $Q_2$ through transformers $CT_2$ and $CT_3$, respectively, so that the output voltage $V_{01}$ may take a target value. As a result, the output voltage $V_{02}$ at the side of converter $CV_2$ becomes proportional to output current $I_{01}$. Moreover, control circuit CON receives a signal corresponding to the total current at the primary side via a current transformer $CT_1$ and an overcurrent detecting circuit $CS_1$ and signals, which correspond to the load currents $I_{01}$ and $I_{02}$ flowing via respective loads $RL_1$ and $RL_2$, via current transformers $CT_4$ and $CT_5$ and overcurrent detecting circuits $CS_2$ and $CS_3$. In response to the overcurrent signal detected from any of the overcurrent detecting circuits $CS_1$ to $CS_3$ (which may be used commonly) switching elements $Q_1$ and $Q_2$ are turned "off", for example, to protect the power supply as a whole.

The embodiment of FIG. 14 comprises a plurality of different types of circuits having a variety of characteristics, which may be combined with other circuits or from which one or more may be omitted, as desired.

As has been described hereinbefore, according to the invention, it is possible to realize the inventive DC/DC converter which can clamp the backswing voltage with only a very small amount of loss and without any failure, even though the construction is simple and inexpensive. Moreover, it is also possible to realize the inventive DC/DC converter which can substantially equalize the allotted output currents of the first and second converters connected in series with each other.

The switching elements referred to herein may comprise, advantageously, transistors or other devices which perform switching functions.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A DC/DC converter comprising
    an AC voltage supply means comprising an AC voltage source, a bridge rectifying circuit for rectifying said AC supply voltage and a smoothing capacitor connected across said bridge rectifying circuit;
    a first converter and a second converter, each comprising
        a transformer comprising a primary coil and a secondary coil,
        a switching element connected in series with said primary coil, and
        a capacitor connected in parallel with said primary coil and said switching element and also connected to said bridge rectifying circuit, for generating DC voltages;
    a first diode connected between one terminal of said primary coil of said transformer of said first converter and a minus terminal of DC input voltage, thereby to form a closed circuit together with said transformer of said first converter and said capacitor of
    said converter when said switching element of said first converter is turned OFF;
    a second diode connected between one terminal of said primary coil of said transformer of said converter and a plus terminal of DC input voltage, thereby to form a closed circuit together with said transformer of said second converter and said capacitor of said first converter when said switching element of said second converter is turned OFF;
    output circuit means for rectifying and smoothing signals generated at respective said secondary coils of said transformers of said first and second converters, thereby to generate DC output voltages, wherein said output circuit means comprises a smoothing capacitor having a pair of terminals, one of said terminals being connected to one side of each of said secondary windings, a first output circuit, and a second output circuit, said first and second output circuits being separate from each other, each of said first and second output circuits comprising a third diode and a fourth diode, each having a negative terminal connected to a terminal of a respective secondary winding and a positive terminal connected to each other to form a node, and a choke coil connected between said node connecting said third and fourth diodes and the other terminal of said smoothing capacitor, such that said DC output voltages are produced at the pair of terminals of said smoothing capacitor with desired current allocation by said first and second converters;

a current transformer connected between a node of a series circuit comprising said first and second converters, and a node of said capacitors of said first and second converters for detecting therethrough total current at the primary side so that said switching elements are driven with suitable phase difference; and control means connected to said other terminal of said smoothing capacitor of said output circuit means, said switching element of each of said first and second converters, said current transformer, and to said switching elements of said first and second converters for receiving signals from said current transformer and from said output circuit means and for applying signals to said switching elements thereby to control said suitable phase difference.

2. The converter of claim 1 wherein said primary coils of said transformers of said first and second converters, each have intermediate taps; and wherein one end terminal of each of said switching elements of said first and second converters are connected to said intermediate taps, respectively.

3. The converter of claim 1, wherein said primary coils of said transformers of said first and second converters each have intermediate taps; and wherein one terminal of said second diode and one terminal of said first diode are connected to said intermediate taps of said first and second converters, respectively.

4. The converter of claim 1, wherein a plurality of said first and second converters are further connected in series with a DC input power source.

5. The converter of claim 1, wherein a plurality of said first and second converters are connected in parallel with a DC input power supply.

6. The converter of claim 1, wherein said first and second converters are ON/ON converters, respectively.

7. The converter of claim 1, wherein said first and second converters are ON/OFF converters, respectively.

8. The converter of claim 1, wherein said switching elements of said first and second converters each comprises a transistor having base, emitter and collector electrodes, a pair of means for driving each respective transistor comprising a resistor, a series circuit comprising a capacitor and a fifth diode connected in parallel with said resistor, and a sixth diode connected between node of said capacitor and said third diode and said collector of said transistor.

9. The converter of claim 1, wherein said phase difference is 180°.

10. A DC/DC converter comprising
a first converter and a second converter, each comprising
a transformer comprising a primary coil and a secondary coil,
a switching element connected in series with said primary coil, and
a capacitor connected in parallel with said primary coil and said switching element for generating a DC voltage;

a first diode connected between one terminal of said primary coil of said transformer of said first converter and a minus terminal of a DC input voltage, thereby to form a closed circuit together with said transformer of said first converter and said capacitor of said second converter when said switching element of said first converter is turned OFF;

a second diode connected between one terminal of said primary coil of said transformer of said second converter and a plus terminal of a DC input voltage, thereby to form a closed circuit together with said transformer of said second converter and said capacitor of said first converter when said switching element of said second converter is turned OFF; and a pair of separate output circuit means for rectifying and smoothing signals generated at respective said secondary coils of said transformers of said first and second converters, thereby to generate first and second DC output voltages which are independent of each other;

a current transformer connected between a node of a series circuit comprising said primary coils of said first and second converters and a node of a series circuit comprising said capacitors of said first and second converters, said current transformer detecting therethrough total current at a primary side so that said switching elements of said first and second converters are driven with a phase difference of 180°;

wherein said switching elements each comprises a transistor having base, emitter and collector electrodes, a pair of means for driving each respective said transistor comprising a resistor, a series circuit comprising a capacitor and a diode connected in parallel with said resistor, and another diode connected between nodes of said capacitor and said diode and said collector of said transistor such that in a steady state current is supplied to said transistor through said resistor with the two diodes being inactive, and in the case of a light load, said another diode operates to provide an overdrive which self balances the load;

an AC voltage supply source having a common line as a reference side;

rectifying circuit means for rectifying said AC supply voltage, comprising a bridge rectifying circuit;

smoothing circuit means comprising a pair of serially connected smoothing capacitors for smoothing output of said rectifying circuit means to generate a DC input voltage;

applying circuit means for applying said DC input voltage to said first and second converters;

a changeover switch connected between the middle point of said two sooothing capacitors and said common line at the reference side of said AC power supply, for conducting a voltage doubled rectification by turning ON said changeover switch and for conducting a bridge rectification by turning OFF said changeover switch; and control means connected to said current transformer, to each of said pair of output circuit means and to each of said pair of means for driving, for receiving signals associated with output voltages of said first and second converters and signals from said current transformer and responsive thereto for applying signals to each of said means for driving to control the duty ratios of the respective transistors of said first and second converters of that said output voltages are target values, said control means receiving at least one signal corresponding to total current at respective primary coils of said first and second converters and signals corresponding to the respective output currents of said first and second converters and responsive thereto sending signals to effect protection against overcurrents by turning OFF said transsistors when said overcurrent exists.

* * * * *